Patented Feb. 11, 1941

2,231,026

UNITED STATES PATENT OFFICE 2,231,026

PROCESS FOR MAKING ALKENYL BENZENES

William M. Quattlebaum and Donald M. Young, Charleston, W. Va., assignors to Carbide and Carbon Chemicals Corporation, a corporation of New York No Drawing. Application September 2, 1937, Serial No. 162,144

6 Claims. (Cl. 260—669)

This invention relates to a process for making alkenyl benzenes, or styrenes, from halogenated-alkyl benzenes. Specifically, the process provides an improved method for purifying the halogenated-alkyl benzene and removing hydrogen halide therefrom under such conditions that the alkenyl benzene is produced at higher reaction rates, in purer form, and in greater yields than by any method known heretofore.

The halogenated-alkyl benzenes suitable for the production of styrenes by this process are those in which a halogen is substituted in the alpha position in a side chain, or alkyl group. These compounds may be prepared by any of the usual methods, although the chloroalkyl and bromoalkyl benzenes are most easily made by the direct halogenation of the alkyl benzene, using the corresponding phosphorus tri- or pentahalide as a catalyst for confining the substitution to a side chain.

The removal of hydrogen halide from halogenated-alkyl benzene is ordinarily accomplished by heating the latter with theoretical or excess quantities of certain bases, such as quinoline, pyridine, amines, and the like. All the known processes for the removal of hydrogen halide from the halogenated-alkyl benzene to form styrenes are attended with certain serious disadvantages. The use of excess or even theoretical amounts of the required bases is almost prohibitive from the commercial standpoint. While the use of amines or amine salts in less than theoretical amounts has been suggested, the products heretofore have been impure and the yields low due to the high production of resinous materials. In any case, the production of the styrenes has been unsatisfactory because the dehydrohalogenation rates of the halogenated-alkyl benzenes, obtainable under the above procedures, have been low.

Other disadvantages of the processes employed heretofore are the difficulty of producing pure halogenated-alkyl benzenes, and rapid corrosion of the metal equipment used in their purification.

The process of this invention is an improvement over all processes known or suggested heretofore. It provides a method whereby alkenyl benzenes may be produced in a pure state at reaction rates far greater than any obtainable heretofore, and which avoids the formation of appreciable amounts of by-products or resinous materials. At the same time, this process provides a method whereby the halogenated-alkyl benzene may be purified without decomposition, and this purification may be conducted in metal equipment which would otherwise be rapidly corroded.

Since this invention is especially applicable to the production of vinyl benzene, or styrene, by the removal of hydrogen chloride from chloroethyl benzene, the following description of the process refers specifically thereto, although the process may be applied to the production of other alkenyl benzenes with satisfactory results.

In the production of styrene by this process, it is highly desirable to purify the chloroethyl benzene prior to removal of hydrogen chloride, for the reason that it is extremely difficult to separate any ethyl benzene (residual in the crude chloroethyl benzene from the chlorination reaction) from styrene by distillation. The chloroethyl benzene itself decomposes to some extent upon distillation under ordinary conditions, with evolution of hydrogen chloride. This may be prevented by adding to the crude chloroethyl benzene a small amount of a stabilizing or decomposition-preventing agent. Ammonia, amines and amine salts have been found particularly useful for this purpose. For instance, the addition of as little as 0.1% of dioctyl amine or of triethanolamine has been found to stabilize the chloroethyl benzene, and the latter may then be distilled without decomposition, preferably at an absolute pressure below 30 mm. of mercury. Moreover, the product thus stabilized may be distilled in metal equipment which would otherwise be badly corroded. Copper and alloys of high copper content have proven especially satisfactory when ammonia is used as the stabilizer.

The pure chloroethyl benzene, obtained by the above procedure, is dehydrochlorinated by heating in the presence of an amine or amine salt at a temperature preferably from about 150° to about 350° C. The exact temperature of operation will depend upon the particular circumstances of operation. The dehydrochlorination of the chloroethyl benzene may be conducted entirely in the vapor phase, or it may be carried out in the liquid phase by heating chloroethyl benzene containing substantial quantities of dissolved amine salt, or by heating an amine salt in which is maintained at least 1%, and preferably 5% to 10%, of dissolved chloroethyl benzene.

This application is directed specifically to the process in which the reaction is conducted in liquid phase. The process in which the reaction is conducted in vapor phase is the subject of our copending application Serial No. 365,567 filed November 14, 1940.

If the reaction is conducted in the vapor phase, the chloroethyl benzene containing about 1.0% of an amine, such as dioctyl amine, or an amine salt, such as dioctyl amine hydrochloride, may be conveniently passed through a chamber or series of tubes maintained at a temperature of about 300° to 350° C.

When operating in the liquid phase, using chloroethyl benzene containing dissolved amine salt, the mixture may be heated at about 140° to 190° C., removing continuously the styrene formed. Although as little as 1% of the soluble catalyst may be used, improved rates and yields are obtained as the quantity of catalyst is increased, until finally catalyst concentrations of 90% to 97% the maximum rates and highest yields are obtained.

The preferred procedure, giving the highest rate of dehydrohalogenation, consists in introducing chloroethyl benzene into a molten higher amine salt, and removing the styrene as fast as formed; the proper ratio of catalyst to chloroethyl benzene is maintained, as indicated by the liquid level in the reaction vessel, by suitably adjusting the rate of addition of chloroethyl benzene, the heat input, and the amount of distillate returned as reflux. The dehydrochlorination of the chloroethyl benzene thus takes place in solution in the catalyst. Using triamylamine hydrochloride or dioctyl amine hydrochloride as catalyst, styrene may be produced more than one hundred times as fast as by any methods known heretofore.

Amines suitable for use in this process are those which yield salts which are stable at the temperatures used for the dehydrohalogenation reaction, and in which the halogenated-alkyl benzene will dissolve. The following amines and their salts have been used most successfully in this reaction: di-2-ethylhexyl amine, diamylamine, triamylamine, dioctylethylamine, dioctylbenzylamine and di-2-ethylbutylamine. The preferred catalyst is di-2-ethylhexylamine hydrochloride. These catalysts will dehydrohalogenate about 50 to 100 times their own weight of chloroethyl benzene before decreasing substantially in activity. They may be recovered by distillation under reduced pressure, or by neutralizing the spent catalyst with alkali and distilling the free amine.

The process of this invention will be illustrated by the following examples:

Example 1

Anhydrous ethyl benzene was placed in a container provided with a gas inlet tube extending to its bottom, a stirrer, and a reflux condenser. About 1% by weight of phosphorus pentachloride was added to the ethyl benzene, and the mixture was brought to a temperature of about 70° C. This temperature was maintained throughout the chlorination reaction. The contents of the container were stirred vigorously, and chlorine was introduced at a rapid rate by means of the gas inlet tube until about 60% of the theoretical amount of chlorine had been absorbed. Dissolved hydrogen chloride and excess chlorine were then removed by blowing nitrogen through the solution for a short period. About 0.1% by weight of dioctyl amine was added to the chloroethyl benzene, and the material distilled at an absolute pressure below 30 mm. of mercury. The fraction boiling between 80° and 84° C. at an absolute pressure of 20 mm. of mercury was collected. If the crude chlorinated material was to be distilled in copper equipment it was treated with anhydrous ammonia instead of with dioctyl amine, since the latter tends to corrode copper.

Example 2

The dehydrochlorination of the chloroethyl benzene, prepared in Example 1, was carried out by placing about 100 parts by weight of dioctyl amine in a container provided with a thermometer, dropping funnel, and a fractionating column with updraft condenser arranged for partial return of the distillate. The amine was heated to about 240° C. and a continuous stream of chloroethyl benzene was introduced into it. The rate was carefully controlled to avoid lowering the temperature of the catalyst, and building up an excess of chloroethyl benzene in the container. Styrene began to distil immediately and the hydrochloride of dioctyl amine was soon formed. When this had occurred, dry hydrogen chloride was evolved along with the styrene and removed at the top of the condenser. Styrene was removed as fast as it was formed, and a small amount was purposely returned as reflux to keep the temperature of the distillate below 140° C. The distillate contained about 85% to about 95% styrene, the remainder being chloroethyl benzene. A single distillation of this mixture gave styrene in a state of high purity, boiling at 46° C. at an absolute pressure of 20 mm. of mercury. The residue from this reaction was about 0.5% of the total through-put of choloroethyl benzene. The reaction rate was about 8 times the container charge per hour.

Although the invention has been described in detail in connection with the production of styrene from chloroethyl benzene, it may also be employed for the production of other alkenyl benzenes. For example, diethyl benzene may be chlorinated and treated to produce divinyl benzene, and bromine may replace the chlorine in the process.

Other amines or salts of amines may be used both as stabilizers and catalysts, but, in general, higher aliphatic amines or amine salts are preferred. The quantities of amines or salts used both as stabilizers and catalysts may be varied considerably, but as stabilizers and for complete vapor phase dehydrohalogenation of the halogenated-alkyl benzene, amounts of about 0.1% to 1.0% of the amines or salts are preferred.

Materials commonly used for reaction equipment may be considered more or less unsatisfactory for dehydrochlorination due to corrosion during the process. The higher reaction rates obtained with the processes of the present invention warrant the use of more costly materials than the slower processes of the prior art. Molybdenum and tantalum have been found to have low corrosion rates.

The foregoing description is given by way of illustration, and many modifications of the process may be made within the scope of the invention as defined by the appended claims.

We claim:

1. In the process of preparing an alkenyl benzene by the dehydrohalogenation of an alpha halogenated alkyl benzene, the step of producing the alkenyl benzene at a high rate of reaction and with a minimum formation of by-products and resinous materials, which comprises maintaining a molten catalyst at a temperature from about 150° to about 300° C., said catalyst comprising a stable salt of an amine having at least two substituent organic radicles each of which contains more than four carbon atoms, said salt being miscible with the halogenated alkyl benzene at the temperature of operation; passing the halogenated alkyl benzene into said molten catalyst at a rate such that at all times the concentration of the amine salt in the reaction mixture is at least about 90%; and removing the alkenyl benzene therefrom in the vapor phase as it is formed.

2. In the process of preparing styrene by the dehydrochlorination of alpha chlorethyl benzene, the step of producing the styrene at a high rate of reaction and with a minimum formation of by-products and resinous materials, which comprises maintaining a molten catalyst at a temperature from about 150° to about 300° C., said catalyst comprising a stable amine salt which is miscible with the chlorethyl benzene at the temperature of operation; passing the chlorethyl benzene into said molten catalyst at a rate such that at all times the concentration of the amine salt in the reaction mixture is at least about 90%; and removing the styrene therefrom in the vapor phase as it is formed.

3. In the process of preparing styrene by the dehydrochlorination of alpha chlorethyl benzene, the step of producing the styrene at a high rate of reaction and with a minimum formation of by-products and resinous materials, which comprises maintaining a molten catalyst at a temperature from about 150° to about 300° C., said catalyst comprising a stable salt of an amine having at least two substituent organic radicles each of which contains more than four carbon atoms, said salt being miscible with the chlorethyl benzene at the temperature of operation; passing the chlorethyl benzene into said molten catalyst at a rate such that at all times the concentration of the amine salt in the reaction mixture is at least about 90%; and removing the styrene therefrom in the vapor phase as it is formed.

4. In the process of preparing styrene by the dehydrochlorination of alpha chlorethyl benzene, the step of producing the styrene at a high rate of reaction and with a minimum formation of by-products and resinous materials, which comprises maintaining a molten catalyst at a temperature from about 150° to about 300° C., said catalyst comprising a stable salt of dioctyl amine which is miscible with the chlorethyl benzene at the temperature of operation; passing the chlorethyl benzene into said molten catalyst at a rate such that at all times the concentration of the amine salt in the reaction mixture is at least about 90%; and removing the styrene therefrom in the vapor phase as it is formed.

5. In the process of preparing styrene by the dehydrochlorination of alpha chlorethyl benzene, the step of producing the styrene at a high rate of reaction and with a minimum formation of by-products and resinous materials, which comprises maintaining a molten catalyst at a temperature from about 150° to about 300° C., said catalyst comprising a stable salt of triamyl amine which is miscible with the chlorethyl benzene at the temperature of operation; passing the chlorethyl benzene into said molten catalyst at a rate such that at all times the concentration of the amine salt in the reaction mixture is at least about 90%; and removing the styrene therefrom in the vapor phase as it is formed.

6. In the process of preparing styrene by the dehydrochlorination of alpha chlorethyl benzene, the step of producing the styrene at a high rate of reaction and with a minimum formation of by-products and resinous materials, which comprises maintaining a molten catalyst at a temperature from about 150° to about 300° C., said catalyst comprising a stable salt of dioctylethyl amine which is miscible with the chlorethyl benzene at the temperature of operation; passing the chlorethyl benzene into said molten catalyst at a rate such that at all times the concentration of the amine salt in the reaction mixture is at least about 90%; and removing the styrene therefrom in the vapor phase as it is formed.

WILLIAM M. QUATTLEBAUM.
DONALD M. YOUNG.